United States Patent [19]

Oberlander et al.

[11] Patent Number: 4,678,025
[45] Date of Patent: Jul. 7, 1987

[54] HEATING/COOLING/VENTILATION UNIT

[76] Inventors: George H. Oberlander, P.O. Box 1505, Watertown, S. Dak. 57201; Keith E. Stormo, 32483 Oakville, Space 74, Albany, Oreg. 97321

[21] Appl. No.: 817,810

[22] Filed: Jan. 10, 1986

Related U.S. Application Data

[63] Continuation of Ser. No. 526,641, Aug. 26, 1983, abandoned.

[51] Int. Cl.[4] .............................................. F25B 29/00
[52] U.S. Cl. ..................................... 165/12; 62/325; 165/48.1; 165/59
[58] Field of Search .................... 165/12, 48 R, 54, 59, 165/174; 62/325; 98/94 AC

[56] References Cited

U.S. PATENT DOCUMENTS

| | | | |
|---|---|---|---|
| 2,401,560 | 6/1946 | Graham et al. | 165/48 R |
| 2,466,383 | 4/1949 | Cody | 62/325 |
| 2,753,157 | 7/1956 | Hoyer | 165/48 R |
| 2,755,072 | 7/1956 | Kreuttner | 165/59 |
| 2,768,814 | 10/1956 | Frey et al. | 165/174 X |
| 2,813,708 | 11/1957 | Frey | 165/174 X |
| 2,969,652 | 1/1961 | Blanchard | 62/325 X |
| 3,003,408 | 10/1961 | McCarty | 98/94 AC X |
| 3,143,864 | 8/1964 | Schordine | 62/325 |
| 4,018,266 | 4/1977 | Kay | 165/12 |
| 4,049,404 | 9/1977 | Johnson | 165/12 X |
| 4,214,626 | 7/1980 | Spethmann | 165/29 |

FOREIGN PATENT DOCUMENTS 3013374 12/1981 Fed. Rep. of Germany ........ 165/54

Primary Examiner—Albert W. Davis, Jr.
Assistant Examiner—Randolph A. Smith
Attorney, Agent, or Firm—Charles N. Hilke

[57] ABSTRACT

An apparatus for heating and cooling which features a unique energy recovery ventilation apparatus and method. During energy recovery ventilation, a cycling damper controls the flow of warm and cool air to maintain the inside air temperature when inside air is cycled to the outside. The outside air is then warmed or cooled when drawn to the inside.

5 Claims, 6 Drawing Figures

HEATING/COOLING/VENTILATION UNIT

This application is a continuation of U.S. Ser. No. 526,641 filed Aug. 26, 1983, now abandoned.

BACKGROUND OF THE INVENTION

This invention relates generally to heat pumps and ventilation systems and, more particularly, to the recovery of energy when the compressor is not operating. The present invention includes a cycling damper to direct the flow of air in such a fashion to maximize recovery of sensible and latent heat during ventilation.

Similar geometric configurations are disclosed in the U.S. Pat. No. 4,049,404; U.S. Pat. No. 3,995,446; U.S. Pat. No. 2,718,119; and U.S. Pat. No. 2,481,348. Moveable dampers to accomplish heating and cooling with the compressor operating are disclosed in U.S. Pat. No. 2,216,427. A combination ventilating and cooling unit is disclosed in U.S. Pat. No. 2,969,652. And finally, auxiliary heating means or the transfer of heat for other uses are disclosed in U.S. Pat. No. 2,969,652 and U.S. Pat. No. 3,176,760.

SUMMARY OF THE INVENTION

Accordingly, it is the general object of the present invention to provide an energy efficient means for the recovery of energy from warm or cool inside air when expelled and provide heat or cold to the incoming fresh air. In other words, the conditions of the expelled air are transferred to the incoming fresh air.

Another object of this invention is to provide heat transfer surfaces of sufficient area for the use of lower specific heat materials.

A further object is to allow the condenser to always operate as a condenser and the evaporator to always operate as an evaporator.

Another further object is to eliminate switching of refrigerant paths as is now done in heat pumps.

Another final object is to decrease the amount of time the compressor is operating.

In accordance with these aims and objectives, there is provided a condenser, a condenser plenum, evaporator, and evaporator plenum, and compressor enclosed within the present invention. The air flow in and out of the apparatus and through the two plenums is controlled by means of three dampers. Each damper is moveable with the primary cycling damper most readily controlled. Two fans are provided to move the air through the present invention. Turning vanes are provided for better air flow. The fins relating to the condenser and evaporator have a proportionally large surface area. Air filter means are provided.

BRIEF DESCRIPTION OF THE DRAWINGS

These and other objects and advantages of the present invention will become more apparent from the following detailed description when read in conjunction with the accompanying drawings wherein.

DETAILED DESCRIPTION OF THE PREFERRED EMBODIMENT

Figure 1:
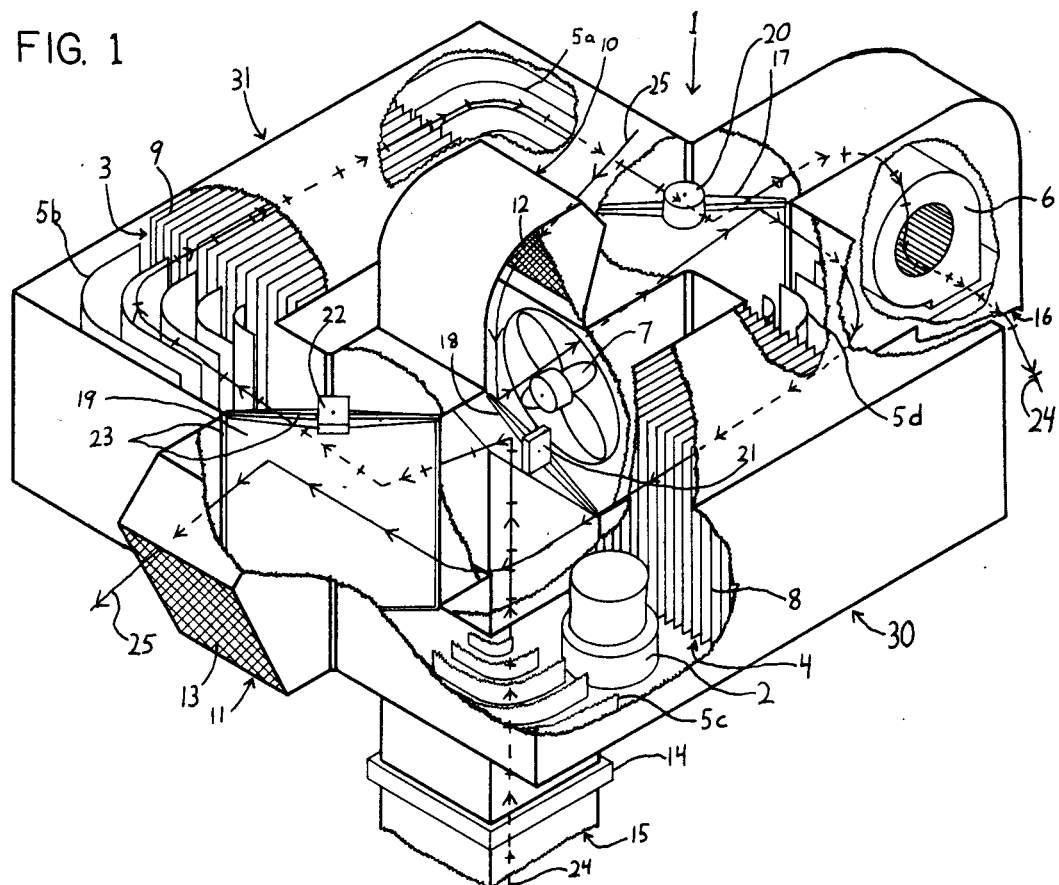
FIG. 1 is a perspective view in partial section showing the present invention in its cooling mode.

Turning now to FIG. 1, the heating/cooling/ventilation unit 1 is shown with several cut away sections. The compressor 2 is shown next to the condenser 4 within the condenser plenum 30. The evaporator 3 is within the evaporator plenum 31. Four sets of turning vanes are provided: the cycling damper/evaporator turning vanes 5a, the evaporator/outside damper turning vanes 5b, the outside damper/condenser turning vanes 5c, and the condenser/cycling damper turning vanes 5d. Two fans are provided, the supply fan 6 and the return fan 7. Heat exchange means are provided. Enlarged condenser fins 8 surround the condenser 4. Similarly, enlarged evaporator fins 9 surround the evaporator 3. The heating/cooling/ventilation unit 1 communicates with the outside air by means of an outside air port or inlet 10 and an outside air port or outlet 11 which may contain an outside air inlet filter 12 and an outside air outlet filter 13, respectively. An inside air inlet filter 14 is held within the inside air inlet 15. Inside air outlet 16 is located near the supply fan 6. The air flow is controlled by three dampers: namely, the cycling damper 17, the return damper 18, and the outside damper 19. Each damper is controlled by a damper motor; namely, cycling damper motor 20, return damper motor 21, and outside damper motor 22. Each damper is provided with damper skids 23 to seal the damper against the inside of the heating/cooling/ventilation unit 1. FIG. 1 shows the air flow during cooling by means of inside cooling air flow 24 and outside air flow (cooling) 25.

Figure 2:
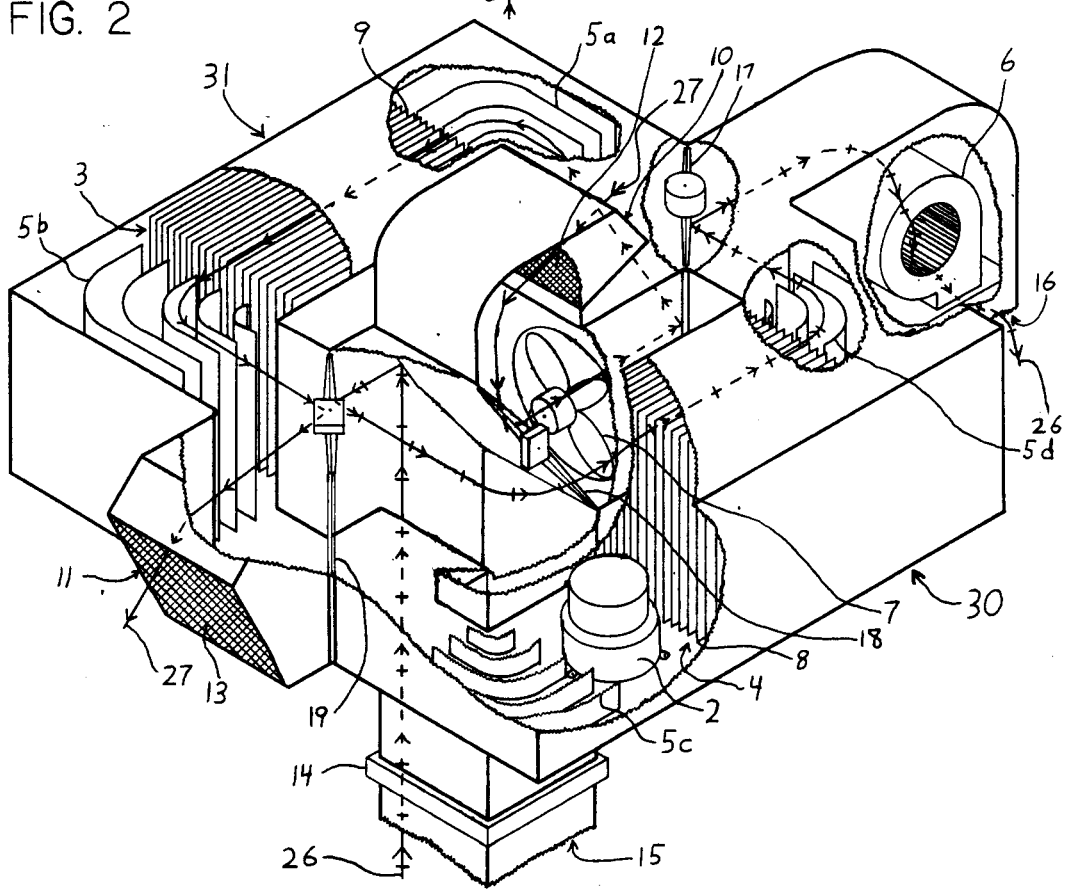
FIG. 2 is a perspective view in partial section of the present invention showing the heating mode in operation.

Turning now to FIG. 2, the heating/cooling/ventilation unit 1 is as described FIG. 1 except that the outside damper 19 and the cycling damper 17 are repositioned. The air flow during heating is shown by inside heating air flow 26 and outside air flow (heating) 27.

Figure 3:
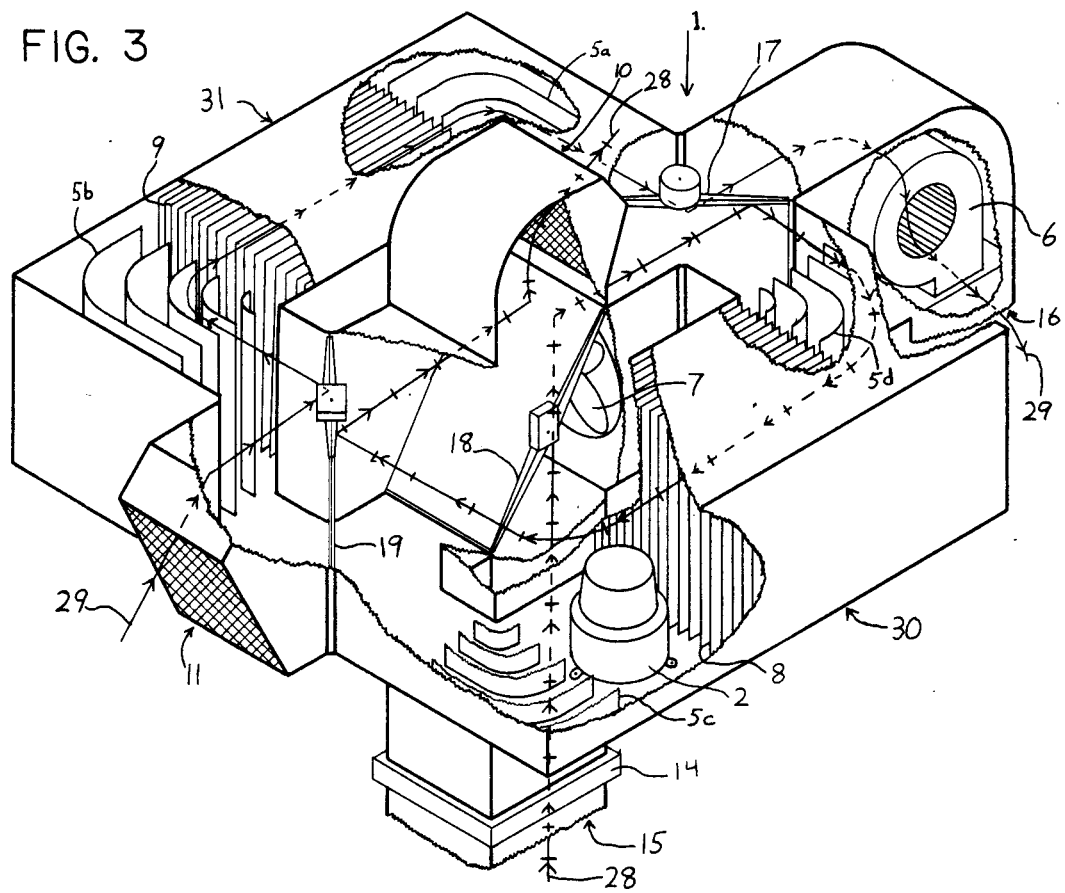
FIG. 3 is a perspective view in partial section of one mode of energy recovery ventilation.
Figure 4:
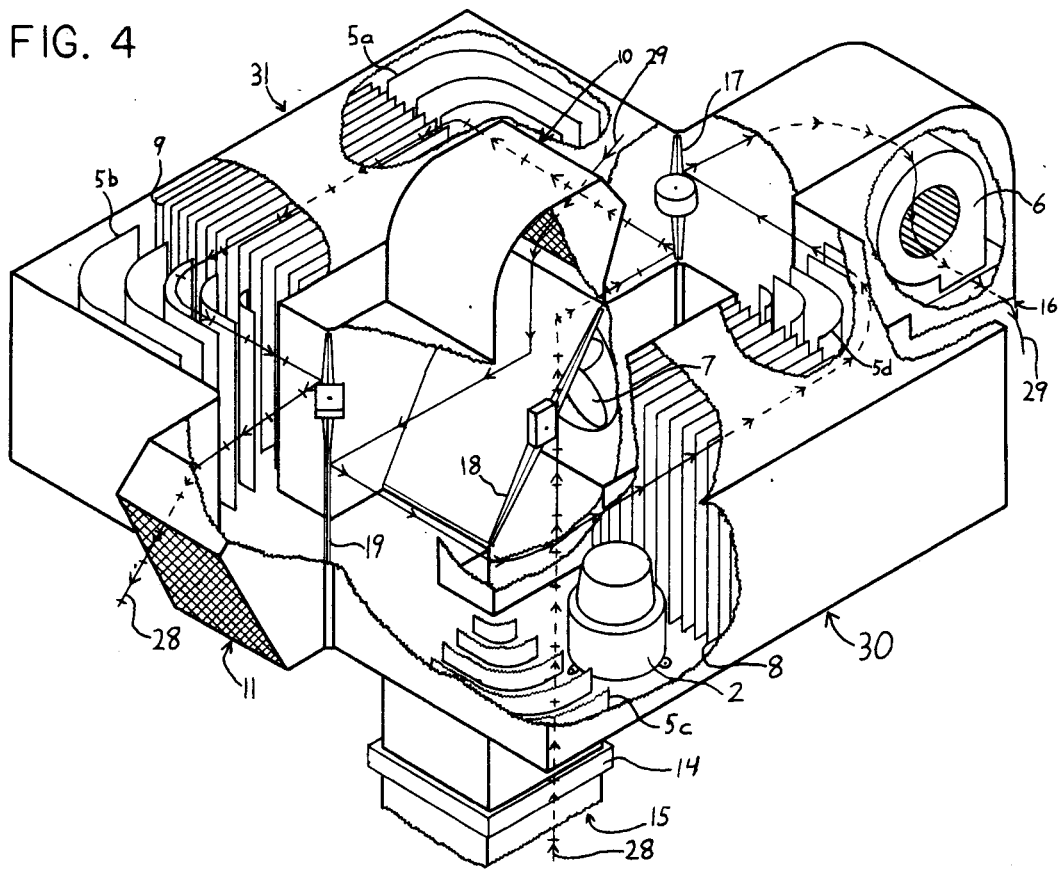
FIG. 4 is a perspective view in partial section of the present invention showing the other mode of energy recovery ventilation.

FIGS. 3 and 4 show the energy recovery ventilation modes of the heating/cooling/ventilation unit 1. The return damper 18 and the outside damper 19 retain a fixed position in both FIGS. 3 and 4. The cycling damper 17 changes position as shown in FIG. 3 when compared with FIG. 4. Ventilation exhaust air 28 is shown in both FIG. 3 and FIG. 4. Ventilation supply air 29 is shown in both FIG. 3 and FIG. 4. Each air flow through the condenser plenum 30 and the evaporator plenum 31 changes in FIG. 3 and FIG. 4. The outside air inlet 10 and the outside air outlet 11 are names applied to the specific portion of the invention so designated. The name does not of itself imply the direction of the air flow. For example, the ventilation supply air 29 in FIG. 3 enters the heating/cooling/ventilation unit 1 through the outside air outlet 11. Similarly in FIG. 3, the ventilation exhaust air 28 exits the heating/cooling/ventilation unit 1 by means of the outside air inlet 10.

Figure 5:
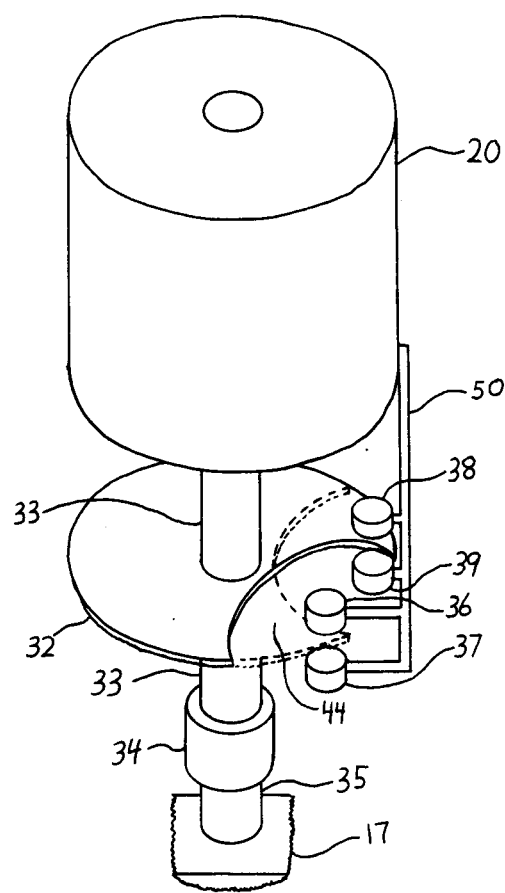
FIG. 5 is a perspective view of the cycling damper motor controls.

In FIG. 5, the cycling damper motor 20 is connected by the cycling damper motor shaft 33 to the optical control disk 32 and to coupling 34. The cycling damper shaft 35 connects the cycling damper 17 to the coupling 34. Bracket 50 holds the counterclockwise light source 36 and the counterclockwise stop phototransistor 37 in the appropriate geometric relationship. Likewise bracket 50 holds the clockwise light source 38 and the clockwise stop phototransistor 39 in appropriate geometric relationship. The disk cutout 44 is shown in its two stop positions in FIG. 5.

Figure 6:
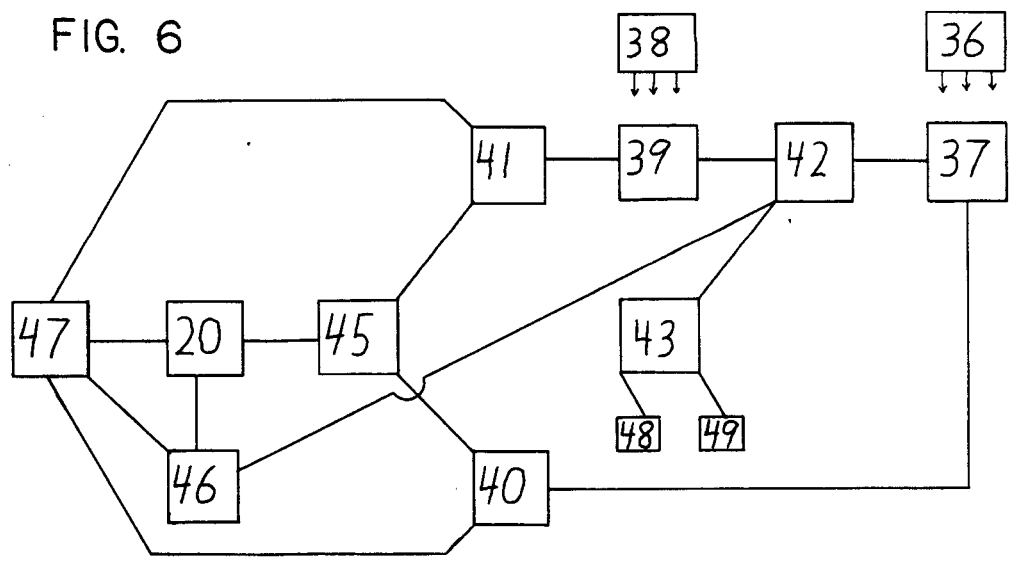
FIG. 6 is a block diagram of the cycling damper motor controls.

In the block diagram of FIG. 6, the power source 47 provides alternating current to the cycling damper motor 20 which is an AC synchronous/stepper motor. The power source 47 is also connected to the control DC power source 46 which supplies direct current to the cycling damper motor 20. The cycling damper motor 20, by means of a phase-shift network 45, is connected to the clockwise solid-state relay 41 and the counterclockwise solid-state relay 40. The power source 47 is also directly connected to the clockwise solid-state relay 41 and the counterclockwise solid-state relay 40. The clockwise solid-state relay 41 is connected to the clockwise stop phototransistor 39 which is placed in appropriate geometrical relationship to the clockwise light source 38. The counterclockwise solid-state relay 40 is connected to the counterclockwise stop phototransistor 37 which is also in appropriate geometrical relationship to the counterclockwise light source 36. A flip-flop 42 is connected to both the counterclockwise stop phototransistor 37 and the clockwise stop phototransistor 39. Furthermore, the flip-flop 42 is directly connected to a square wave symmetrical generator 43. The square wave symmetrical generator 43 receives temperature readings from the inside air temperature sensor 48 and the outside air temperature sensor 49. The control DC power source 46 is directly connected to the flip-flop 42.

Turning now to the cooling operation and refering to FIG. 1, inside cooling air flow 24 enters the heating-/cooling/ventilation unit 1 through the inside air inlet 15 and passes through the inside air inlet filter 14. Inside cooling air flow 24 is deflected by the return damper 18 until the inside cooling air flow 24 strikes the outside damper 19. In the evaporator plenum 31 the inside cooling air flow 24 then is turned by the evaporator/outside damper turning vanes 5b and passes through the evaporator 3 and evaporator fins 9. Inside cooling air flow 24 is next passed through cycling damper/evaporator turning vanes 5a exiting evaporator plenum 31, and striking cycling damper 17 where it is drawn through supply fan 6 and exits the heating/cooling/ventilation unit 1 through the inside air outlet 16. Outside air flow (cooling) 25 enters through outside air inlet 10 and passes through outside air inlet filter 12, strikes return damper 18, is drawn through return fan 7 and strikes cycling damper 17. In the condenser plenum 30 outside air flow (cooling) 25 passes through condenser/cycling damper turning vanes 5d and passes through the condenser 4 and condenser fins 8. Outside air flow (cooling) 25 then strikes outside damper/condenser turning vanes 5c exiting condenser plenum 30 until the outside damper 19 directs the outside air flow (cooling) 25 through the outside air outlet filter 13 and the outside air outlet 11 to the outside. While in operation, the compressor 2 is running, and heat is removed from inside cooling air flow 24 and transferred to outside air flow (cooling) 25 as is usual in a heat pump operating in the cooling mode.

The operation of the heating mode is shown in FIG. 2. The inside heating air flow 26 passes through the inside air inlet 15 until it strikes the return damper 18 and is deflected until it strikes the outside damper 19. In the condenser plenum 30 inside heating air flow 26 passes through the outside damper/condenser turning vanes 5c and then passes through the condenser 4 and condenser fins 8. The condenser/cycling damper turning vanes 5d turn the inside heating air flow 26 out of the condenser plenum 30 and against the cycling damper 17 from which it is drawn by the supply fan 6 and forced out inside air outlet 16 and returns to the inside. Outside air flow (heating) 27 enters through the outside air inlet 10 and the outside air inlet filter 12 until it strikes return damper 18 and is carried through the return fan 7 until it strikes the cycling damper 17. In the evaporator plenum 31 the cycling damper/evaporator turning vanes 5a deflect the outside air flow (heating) 27 through the evaporator 3 and evaporator fins 9. The evaporator/outside damper turning vanes 5b deflect the outside air flow (heating) 27 out of evaporator plenum 31 and into the outside damper 19 which in turn deflects the outside air flow (heating) 27 through the outside air outlet filter 13 and out the outside air outlet 11. The compressor 2 is operating during the heating mode and heat is transferred from the outside air flow (heating) 27 to the inside heating air flow 26 in the usual manner of a heat pump operating during the heating mode.

In FIGS. 3 and 4 the energy recovery ventilation is shown. The compressor 2 is not operating during energy recovery ventilation. It should also be noted that the cycling damper 17 is the only damper which changes position during energy recovery ventilation. The cycling damper 17 changes position approximately every 5 to 20 seconds as is described below. Referring now to FIG. 3 the ventilation exhaust air 28 enters heating/cooling/ventilation unit 1 through the inside air inlet 15 and inside air inlet filter 14 until it is deflected by the return damper 18 and is carried through the return fan 7 until the ventilation exhaust air 28 strikes the cycling damper 17. In the condenser plenum 30 the condenser /cycling damper turning vanes 5d then direct the ventilation exhaust air 28 over the condenser fins 8 and subsequently through outside damper/condenser turning vanes 5c before exiting the condenser plenum 30. The outside damper 19 deflects ventilation exhaust air 28 to return damper 18 and then to the outside air through the outside air inlet 10. Ventilation supply air 29 enters the heating/cooling/ventilation unit 1 by means of outside air outlet 11 and strikes the outside damper 19 entering evaporator plenum 31. Evaporator/outside damper turning vanes 5b deflect the ventilation supply air 29 through the evaporator fins 9 and through cycling damper/evaporator turning vanes 5a exiting evaporator plenum 31. Cycling damper 17 deflects the ventilation supply air 29 which is drawn by the supply fan 6 and forced out the inside air outlet 16. Again, please note that in FIG. 3 the ventilation supply air 29 enters the heating/cooling/ventilation unit 1 through the outside air outlet 11. Similarly, the ventilation exhaust air 28 exits the heating/cooling/ventilation unit 1 through the outside air inlet 10.

In FIG. 4, ventilation exhaust air 28 enters through the inside air inlet 15 and the inside air inlet filter 14 until it strikes the return damper 18 from whence it flows through the return fan 7, again strikes the cycling damper 17, but now enters evaporator plenum 31. The cycling damper/evaporator turning vanes 5a direct the ventilation exhaust air 28 through the evaporator fins 9 and through the evaporator/outside damper turning vanes 5b before exiting the evaporator plenum 31. Ventilation exhaust air 29 strikes outside damper 19 and communicates to the outside through outside air outlet 11. Ventilation supply air 29 enters through outside air inlet 10, strikes the return damper 18, strikes the outside damper 19, and enters the condenser plenum 30. Ventilation supply air 29 is directed by outside damper/condenser turning vanes 5c through the condenser fins 8 and turned subsequently by condenser/ cycling turning vanes 5d exiting the condenser plenum 30. The cycling damper 17 deflects ventilation supply air 29 which is drawn by supply fan 6 and forced through inside air outlet 16 to the inside.

In the previously described operation in both FIG. 3 and FIG. 4, the compressor 2 is not operating. The evaporator fins 9 and condenser fins 8 give up heat or absorb heat as required by the relative temperatures of the ventilation exhaust air 28 and the ventilation supply air 29. For example, if we assume the heating/cooling/ventilation unit 1 is operating during the winter, the temperature in the building will be warm and the outside temperature will be cool. Under these conditions as shown in FIG. 3, the evaporator fins 9 are transferring heat and moisture to the ventilation supply air 29 which is passing through the evaporator plenum 31 prior to entering the building. At the same time, heat and moisture are transferred to the condenser fins 8 by the ventilation exhaust air 28 while passing through condenser plenum 31 prior to exiting the building. After 5 to 20 seconds, the condenser fins 8 hold heat and moisture and the evaporator fins 9 are depleted of heat and moisture. Now the cycling damper 17 will change positions to that shown in FIG. 4. Then, the ventilation supply air 29 will receive this heat and moisture from the condenser fins 8 while passing through the condenser plenum 31 prior to entering the building. At the same time, ventilation exhaust air 28 will transfer its heat and mositure to the evaporator fins 9 while passing through the evaporator plenum 31 prior to exiting the building. Thus, the ventilation supply air 29 is heated prior to entering the building without the compressor 2 running.

If the heating/cooling/ventilation unit 1 is operating during the summer, the building air temperature will be cool and the outside air temperature will be warm. Under these conditions, in FIG. 3, the evaporator fins 9 are absorbing heat from the ventilation supply air 29 while passing through the evaporator plenum 31 prior to entering the building. Heat is transferred by the condenser fins 8 to the ventilation exhaust air 28 while passing through condenser plenum 31 prior to exiting the building. After 5 to 20 seconds the cycling damper 17 will change it position to that shown in FIG. 4. Then, the evaporator fins 9 are transferring heat to the ventilation exhaust air 28 while passing through the evaporator plenum 31 prior to exiting the building. Heat is absorbed by the condenser fins 8 from the ventilation supply air 29 while passing through condenser plenum 31 prior to entering the building. Thus, the ventilation supply air 29 is cooled prior to entering the building.

FIG. 5, the physical operation of the cycling damper motor 20 is shown. The cycling damper 17 must be controlled so that it can stop at two defined positions shown in FIG. 3 and FIG. 4. Thus, it is necessary to control the movement of the cycling damper 17. This is accomplished by means of a optical control disk 32 with a disk cutout 44. As shown in FIG. 5, the disk can interrupt the light which flows from the counterclockwise light source 36 to the counterclockwise stop phototransistor 37. By appropriate movement of the optical control disk 32, the light from clockwise light source 38 can be prevented from reaching the clockwise stop phototransistor 39. In operation, we assume the counterclockwise source 36 strikes the counterclockwise stop phototransistor 37. If the flip-flop 42 has been appropriately set by the square wave symmetrical generator 43 then control circuit current will flow from the counterclockwise stop phototransistor 37 to the counterclockwise solid-state relay 40. The AC drive current from power source 47 will then flow from the counterclockwise solid-state relay 40 to the phase-shift network 45 through the cycling damper motor 20 which will activate it in a counterclockwise direction turning the cycling damper 17 and the optical control disk 32. Once the optical control disk 32 prevents the light emitting from the counterclockwise light source 36 from striking the counterclockwise stop phototransistor 37, the control circuit current will no longer flow through flip-flop 42. This causes the directly connected control DC power source 46 to send DC hold current to cycling damper motor 20 and hold it in its defined counterclockwise stop position. As can be readily seen, when control circuit current is flowing through either of the two sides of flip-flop 42, AC drive current from power source 47 is driving the cycling damper motor 20. Whenever control circuit current is not flowing through flip-flop 42, the DC drive current from control DC power source 46 will hold cycling damper motor 20 in a fixed stop position. As can be readily seen, light from the clockwise light source 38 is now passing through disk cutout 44 and stiking the clockwise phototransistor 39. The cycling damper 17 defined will stay in its defined counterclockwise stop position because the cycling damper motor 20 is held stationery by the DC hold current from control DC power source 46. After a certain time period as determined by comparison of the different signals received from the inside air temperature sensor 48 and the outside air temperature sensor 49, the square wave symmetrical generator 43 changes states. This time period will vary between 5 and 20 seconds with the greater the temperature difference, the longer the period. When this symmetrical square wave generator 43 changes states the flip-flop 42 switches and allows control circuit current to flow through clockwise phototransistor 39 and through clockwise solid-state relay 41. This control circuit current also stops the DC cold current from the control DC power source 46. With the clockwise solid-state relay 41 activated, the AC drive current from power source 47 goes through phase-shift network 45 and activates the cycling damper motor 20 in a clockwise direction until the optical control disc 32 blocks the light from clockwise light source 38 to clockwise stop phototransistor 39 which will stop the control circuit and activate DC holding current from control DC power source 46.

Under some conditions, fresh outside air may be required but cross-contamination of the air flows within the heating/cooling/ventilation unit 1 is not acceptable. This condition may be required in the production of certain high technology products which require a clean environment, hospital systems, and industries where certain noxious odors must be removed. To satisfy this condition, the heating/cooling/ventilation unit 1 can be operated with the compressor 2 operating in the heating mode with the dampers as shown in FIG. 4. Heat is then removed from the ventilation exhaust air 28 by the evaporator fins 9 and evaporator 3 in the evaporator plenum 31 before exhausting it out outside air outlet 11. Ventilation supply air 29 is brought in outside inlet 10 and is heated when passing the condenser 4 and condenser fins 8 before entering the building through inside air outlet 16.

Using the same conditions of no cross-contamination and operating the heating/cooling/ventilation unit 1 in the cooling mode, the compressor 2 is operated with dampers as shown in FIG. 3. The ventilation supply air 29 has heat removed by the evaporator 3 and evaporator fins 9 in the evaporator plenum 31. The ventilation supply air 29 exits the evaporator plenum 31 and enters the building through inside air outlet 16. The refrigerant transfers this heat from the evaporator 3 to the condenser 4. The ventilation exhaust air 28 is heated by the condenser 4 and condenser fins 8 in the condenser plenum 30 before exiting the building through outside air inlet 10.

The outside air inlet filter 12 and the outside air outlet filter 13 are optional filters to be used only where necessary. Each must operate with air flow through the filters in both directions. Thus, outside air inlet filter 12 and outside air outlet filter 13 must be two way filters when used.

While the compressor 2 has been shown within the heating/cooling/ventilation unit 1 in FIGS. 1, 2, 3, and 4, some building codes may require that the compressor be outside the heating/cooling/ventilation unit 1. This can of course be accomplished simply by the use of appropriate refrigerant plumbing. A review of our previous discussion involving the use of the heating-/cooling/ventilation unit 1 reveals that the evaporator 3 always acts as an evaporator and the condenser 4 always acts as an condenser. In many modern heat pumps the refrigerant flow is reversed by appropriate valving so that the evaporator sometimes acts as a condenser and a condenser sometimes acts as an evaporator. Eliminating the switching of refrigerant paths allows optimal design of both the evaporator 3 and condenser 4.

In the preferred embodiment, the evaporator fins 9 and condenser fins 8 are optimally designed to fill the evaporator plenum 31 and the condenser plenum 30 from top to bottom. The condenser fins 8 and evaporator fins 9 are elongated and restricted only by the turning vanes. Thus, materials used for heat exchange means in the condenser fins 8 and evaporator fins 9 can be of lower specific heat, for example, plastic.

What is claimed is:

1. Heating/cooling/ventilation unit comprising:
    a. a casing having a condenser plenum and an evaporator plenum, said condenser plenum having a first and second end and said evaporator plenum having a first and second end, said casing having two outside air ports, an inside air outlet, and an inside air inlet connected to said plenums;
    b. a compressor connected to an evaporator with evaporator fins and connected to a condenser with condenser fins housed within said condenser plenum and said evaporator plenum;
    c. turning vanes housed within said plenums;
    d. an outside damper pivotably connected to said casing and positioned between the first end of the evaporator plenum and the first end of the condenser plenum, a cycling damper pivotably connected within said inside air outlet and positioned between the second end of the evaporator plenum and the second end of the condenser plenum, and a return damper between the outside damper, said cycling damper, said inside air inlet and one of the outside air ports;
    e. means for controlling said cycling damper; and
    f. a supply fan located between an inside air inlet and an outside air inlet both of which are interconnected to said plenums and a return fan within an inside air outlet interconnected to said plenums and an outside air outlet interconnected to said plenums.

2. Heating/cooling/ventilation unit of claim 1 wherein said evaporator fins extend from the top to the bottom of the evaporator plenum and to each said adjacent turning vanes and wherein said condenser fins extend from the top to the bottom of the condenser plenum and to each said adjacent turning vanes.

3. The heating/cooling/ventilation unit of claim 1 wherein said means for controlling said cycling damper comprises:
    o. a cycling damper shaft interconnected by a coupling to the cycling damper motor shaft within said inside air outlet;
    p. an optical controlled disk with disk cutout mounted on said cycling damper motor shaft;
    q. a counterclockwise stop phototransistor geometrically arranged to receive light from the counterclockwise light source both of which are mounted on a bracket within said inside air outlet and where said optical controlled disk can pass between said counterclockwise stop phototransistor and said counterclockwise light source;
    r. a clockwise stop phototransistor geometrically arranged to received light from a clockwise light source both of which are mounted on a bracket within said inside air outlet and where said optical controlled disk can pass between said clockwise stop phototransistor and said clockwise light source;
    s. a flip-flop grounded and interconnected to the counterclockwise stop phototransistor and said clockwise stop phototransistor and, further, interconnected to square wave symmetrical generator which receives inputs from the inside air temperature sensor and the outside air temperature sensor;
    t. an alternating current power source interconnected with a counterclockwise solid-state relay and interconnected with a clockwise solid-state relay;
    u. an AC synchronous/stepper motor driven by a phaseshift network and held stationary by a control DC source.

4. The means for controlling said cycling damper of claim 3 wherein said control DC source is interconnected to said flip-flop.

5. Heating/cooling/ventilation unit in heat recovery ventilation mode comprising:
    a. a casing having a condenser plenum and an evaporator plenum said condenser plenum having a first and second end and said evaporator plenum having a first and second end, said casing having two outside air ports, an inside air outlet, and an inside air inlet connected to said plenums;
    b. evaporator fins housed within said evaporator plenum and condenser fins housed within said condenser plenum;
    c. turning vanes housed within said plenums;
    d. an outside damper pivotably connected to said casing and positioned between the first end of the evaporator plenum and the first end of the condenser plenum, a cycling damper pivotably connected within said inside air outlet and positioned between the second end of the evaporator plenum and the second end of the condenser plenum, and a return damper between the outside damper, said cycling damper, said inside air inlet and one of the outside air ports;
e. means for controlling said cycling damper; and
f. a supply fan located between an inside air inlet and an outside air inlet both of which are interconnected to said plenums and a return fan within an inside air outlet interconnected to said plenums and an outside air outlet interconnected to said plenums.

* * * * *